United States Patent [19]

Cooper et al.

[11] Patent Number: 5,362,850
[45] Date of Patent: Nov. 8, 1994

[54] PROCESS FOR REMOVING PALLADIUM FROM POLYKETONES

[75] Inventors: Jeremy B. Cooper, West Sussex; Andrew R. Lucy, Surrey; Kevin G. Smith, Middlesex, all of United Kingdom

[73] Assignee: BP Chemicals Limited, London, England

[21] Appl. No.: 119,204
[22] PCT Filed: Feb. 22, 1993
[86] PCT No.: PCT/GB93/00366
§ 371 Date: Sep. 22, 1993
§ 102(e) Date: Sep. 22, 1993
[87] PCT Pub. No.: WO93/17061
PCT Pub. Date: Sep. 2, 1993

[30] Foreign Application Priority Data

Feb. 25, 1992 [GB] United Kingdom ............... 9203988

[51] Int. Cl.$^5$ ............................................. C08G 67/02
[52] U.S. Cl. ................................... 528/483; 525/539; 528/392; 528/497; 528/498
[58] Field of Search ................ 525/539; 528/392, 483, 528/497, 498

[56] References Cited

U.S. PATENT DOCUMENTS 4,791,190 12/1988 Van Broekhoven ............... 528/483
5,070,184 12/1991 Wong ................................. 528/498

Primary Examiner—Morton Foelak
Attorney, Agent, or Firm—Brooks Haidt Haffner & Delahunty

[57] ABSTRACT

A process is disclosed for removing palladium from a contaminated polyketone containing palladium which comprises contacting the contaminated polyketone with an olefin in the substantial absence of carbon monoxide at a temperature above the temperature at which the polyketone was formed and in a solvent in which the contaminated polyketone is insoluble. The process is preferably carried out in the presence of an acid. The temperature at which the process is carried out is preferably at least 20° C. greater than the polymerization temperature.

11 Claims, No Drawings

PROCESS FOR REMOVING PALLADIUM FROM POLYKETONES

The present invention is concerned with the removal of palladium from polyketones.

It is known from EP 121864 and many subsequent patent applications that polyketones, which are linear polymers comprised of alternating units of (1) —CO— and (2) one or more divalent units derived from one or more corresponding olefins, can be prepared by polymerising carbon monoxide with one or more olefins in an appropriate solvent in the presence of a catalyst prepared from a source of palladium, a diphosphine and a source of the conjugate base (anion) of certain acids having a pKa of less than 2. The process, which can be carried out either batchwise or continuously is typically effected at elevated temperature and pressure. A preferred solvent is a lower aliphatic alcohol such as methanol in which the polyketone is insoluble.

The synthesis of polyketones using the above-mentioned or similar palladium catalysts suffers from the disadvantage that significant levels of palladium are incorporated into the polymer mass during its preparation. This is a two-fold problem because firstly palladium is an expensive metal and secondly the incorporated palladium tends to adversely affect the subsequent processability of the polyketone. It would be desirable therefore to identify a method of recovering the palladium from the polyketone particularly if it can be recovered in a form in which it can be re-used without further treatment. Ideally such a method should also be easy to operate on a large scale and not add undue complexity to the polymerisation process.

A number of ways of solving this problem have been published in the art. For example, EP 224304 shows that under conditions where 95% of the palladium used was retained in the polymer, treatment with carbon monoxide followed by a washing step reduced the residual level of palladium to 29%. Similarly in EP 227135, treatment with a phosphine reduced the residual level to 37%.

In EP 283092, treatment of an ethylene/carbon monoxide copolymer with triethylamine reduced catalyst levels from 81 to 42% whilst treatment of an ethylene/propylene/carbon monoxide with triphenylphosphine reduced levels from 67 to 20%. For the same polymer, sodium acetate reduced catalyst levels from 67 to 27%.

Finally, EP 285218 teaches phosphine and amine terminating agents with the additional point that the temperature must be raised after the additional reagent is introduced, giving improvements in catalyst losses of e.g. 67 to 5% and 86 to 6%.

All these approaches to solving the problem have disadvantages. Phosphines, amines and acetates are reagents which cannot be directly recycled to the polymerisation reactor because under certain circumstances they adversely affect the catalyst. Carbon monoxide, on the other hand, is more easily vented from an olefin/CO mixture; consequently the complexity of the polymerisation process can be reduced if the carbon monoxide is removed in preference to the olefin or olefins.

A method of treatment has now been found which gives good catalyst recovery.

According to the present invention there is provided a process for removing palladium from a contaminated polyketone containing palladium which comprises contacting the contaminated polyketone with an olefin in the substantial absence of carbon monoxide at a temperature above the temperature at which the polyketone was formed and in a solvent in which the contaminated polyketone is insoluble.

The present invention solves the problem defined above by contacting the contaminated polyketone with an olefin e.g. ethylene in the substantial absence of carbon monoxide in a solvent, e.g. methanol, in which it is insoluble at a temperature above the temperature at which the polyketone was prepared. This causes the palladium to be extracted out of the polyketone into the solvent. Thereafter the polyketone and the solvent containing the palladium can be separated by filtration or other techniques which will be readily apparent to one of ordinary skill.

It is preferred that the process of the present invention is carried out in the presence of an acid.

By the term polyketone is meant a linear polymer comprised of alternating units of (1) —CO— and (2) one or more divalent units derived from one or more corresponding olefins. Specifically, it is a linear polymer comprised of alternating —CO— and —X— units where X is for example —$CH_2CH_2$—, in the case where carbon monoxide and ethylene are copolymerised or a random arrangement of —$CH_2CH_2$— and —$CH_2CH$(-R)— (R=$C_1$ to $C_8$ alkyl, phenyl or methyl or ethyl substituted phenyl) in the case where a mixture of carbon monoxide, ethylene and an olefin of formula RCH=$CH_2$ are terpolymerised. In the case of the latter class of material it is preferred that R is $C_1$ to $C_4$ alkyl especially methyl or ethyl.

For the terpolymer polyketones it is preferred that at least 70 mole %, most preferably at least 80 mole %, of the X units are —$CH_2CH_2$—.

The olefin used to effect the extraction is suitably a $C_2$ to $C_6$ aliphatic olefin preferably ethylene, propylene or mixtures thereof. Especially preferred is the use of the olefin or olefins used in the synthesis of the polyketone.

Whilst it is desirable that the olefin used to effect extraction is as pure as possible, the presence of minor amounts (preferably less than 1 bar e.g. 0.1 bar) of other gases such as hydrogen and carbon monoxide can be tolerated.

The process of the present invention is preferably carried out in the presence of an acid.

Any acid can in principle be used in the process, where the polyketone has been prepared using a catalyst comprising palladium, a phosphine and an acid of the type described above or its conjugate base (anion), it is preferable that the corresponding acid of those anions forming part of the catalyst composition (vide infra) is used. The acid should be present in amounts such that the molar ratio of acid to palladium in the contaminated polyketone is in the range 0.5:1 to 5000:1 preferably 1:1 to 1000:1.

The process of the present invention is suitably carried out by suspending the contaminated polyketone in a solvent in which it is insoluble preferably in the presence of the acid. Since the polyketone tends to be insoluble in most solvents a wide choice of materials is available. Particular preference however is given to the solvent in which the polyketone was prepared since on a commercial scale this greatly simplifies the manufacturing process. Typical examples of preferred solvents therefore are lower aliphatic alcohols and glycols and mixtures of alcohols e.g. tertiary alcohols with ketones.

Most preferred examples of these solvents are $C_1$ to $C_6$ aliphatic primary alcohols e.g. methanol, ethanol and n-propanol and mixtures of $C_4$ to $C_6$ aliphatic tertiary alcohols, preferably t-butanol, with ketones such as acetone, methyl ethyl ketone and methyl isobutyl ketone.

When the solvent in which the polyketone is prepared is used for the process of the present invention, either fresh solvent preferably with added acid can be employed once the original batch of reaction medium has been removed or alternatively the original reaction medium, which may be acidic, can be used. This latter embodiment has the advantage of further simplicity and avoids having to recover palladium from a separate batch of solvent. To operate such an embodiment, the polyketone-containing reaction medium is merely contacted with the olefin after the original gaseous reactants have been removed by depressurisation and flushing.

Alternatively, near the end of the polymerisation the carbon monoxide but not the olefin supply can be limited. By doing this, the continuing polymerisation of the reactants progressively reduces the amount of residual carbon monoxide present.

The process of the present invention is easily effected by contacting the polyketone-containing solvent with the olefin at a superatmospheric pressure of up to 50 bars and a temperature in the range 10° to 150° C. preferably 80° to 150° C., more preferably 90°–110° C. e.g. 100° C. In particular the temperature at which the process of the invention is carried out should be higher (e.g. at least 20° C. higher) than the temperature at which the polyketone was formed.

The extraction can be monitored by periodic withdrawal of a sample of the polyketone for analysis but typically an extraction time in the range 0.1 to 20 hours e.g. 0.1 to 4 hours is adequate.

After the extraction is complete, excess olefin is removed. The purified polyketone and solvent can then be separated by filtration or other standard methods. It is usually advantageous to wash or extract the purified polyketone to remove traces of the original solvent and soluble palladium. Again it is usually simplest to use a fresh batch of the original solvent.

The polyketones employed in the process of the present invention are typically prepared by polymerising one or more olefins of the type defined earlier with carbon monoxide in the presence of a solvent of the type described above and a palladium catalyst.

The purity of the carbon monoxide used in this process is not especially critical although it is preferred that it contains less than 20% by volume of other gases such as hydrogen.

Turning to the catalyst the process of the present invention is suitable for use with polyketones that have been prepared using a catalyst prepared from a source of palladium, preferably from a source of palladium, a diphosphine and a non-coordinating or weakly coordinating anion (vide infra). Whilst it is believed that the source of palladium is not critical it is preferred to use a palladium carboxylate salt e.g. palladium acetate, palladium propionate or palladium acetoacetonate. Sources of palladium containing strongly coordinating anions or ligands, e.g. palladium halides, can be used as precursors provided that the anions or ligands are removed from the catalyst composition before use.

A further component of the above preferred catalyst composition is an anion which is either non-coordinating or only weakly coordinating to palladium. Typical although not exhaustive examples of such anions are (1) the conjugate bases of acids having a pKa of less than 2 as measured at 25° C. in water with the exception of hydrogen halides (EP 121965) or (2) the borate anions disclosed in EP 314309. Examples of suitable anions include para-toluenesulphonate, trifluoracetate, difluoroacetate, tetafluoroborate and borate anions of the type described in EP 314309.

As regards the phosphine of the above preferred catalyst composition, whilst this can include simple phosphines such as $C_1$ to $C_{10}$ trialkylphosphines, $C_6$ to $C_{10}$ triarylphosphines and the like it is preferred that the phosphine is a diphosphine thereby allowing it to adopt a bidentate coordination to palladium. Preferred examples are those having the formula $(R^1)_2P-R^2-P(R^1)_2$ wherein the $R^1$ groups are independently $C_6$ to $C_{10}$ aromatic groups and $R^2$ is a divalent bridging group of formula $-(CH_2)_n-$ where n=2 to 8. The aromatic groups may optionally be substituted with polar groups such as $-OR^3$, $-SR^3$ and the like where $R^3$ is $C_1$ to $C_4$ alkyl. Preferred diphosphines are those of formula $(Ph)_2P-(CH_2)_m-P(Ph)_2$ where Ph=phenyl and m=2 to 6 or corresponding compounds where one or more of the phenyl groups are $C_1$ to $C_4$ alkoxy substituted. Especially preferred diphosphines are those wherein m=2 to 4.

The catalyst as described above can be generated in situ under the reaction conditions by charging sources of the three components to the polymerisation reactor. Alternatively it is possible to add a precursor palladium complex of formula $ZPd(OAc)_2$ or $ZPd(Q)_2^{2+}2X^-$ which has been prepared beforehand. In these formulae Z is either two monophosphines or the diphosphine referred to above, X is the non- or weakly coordinating anion above and Q is a weakly coordinating ligand such as a nitrile.

If the above catalyst is to be prepared in situ in the polymerisation reactor then in the case of the diphosphine it is preferred that the molar ratio of diphosphine to palladium charged is in the range 0.8:1 to 3.0:1 whilst the ratio of anion to palladium is in the range 2:1 to 500:1. Irrespective of how the catalyst is prepared it is preferred that the molar ratio of palladium to total olefin(s) to be polymerised is in the range $10^{-7}$ to 1 to $10^{-3}$ to 1.

The polymerisation process is suitably carried out by feeding one or more liquid streams, which in total comprise (1) the components for generating the catalyst or an independently prepared precursor palladium complex, (2) the solvent and (3) any liquid olefin(s) employed, to a polymerisation reactor together with gaseous streams in total comprising carbon monoxide and any gaseous olefins used. The polymerisation reactor is suitably maintained at a temperature in the range 40° to 150° C. preferably 50° to 110° C. most preferably 65° to 85° C. and at a pressure in the range 10 to 250 bars, preferably 20 to 150 bars, more preferably 20 to 80 bars. It is preferred that the molar ratio of ethylene to carbon monoxide in the polymerisation reactor is in the range 2:1 to 1:2. The polymerisation reactor can be operated either batchwise or continuously.

Example 1 (according to the Invention)

A carbon monoxide/ethylene/propene terpolymer was prepared as follows. A mechanically stirred autoclave of 300 ml capacity was charged with 27.6 mg of [Pd(1,3-bis(diphenylphosphino)propane) (PhCN)$_2$]

[BF$_4$]$_2$, 1.22 g of hydrogen bis(salicylato)borate, 0.96 g of benzoquinone and 80 cm$^3$ of methanol. The autoclave was sealed and 21.97 g propene condensed in at −78° C. The autoclave was warmed to ambient temperature and stirring commenced. A 1:1 mixture of CO and ethylene was admitted (8 bar gauge) before heating to 50° C. The pressure was adjusted to 56 bar gauge and these conditions maintained for one hour. The vessel was then cooled to 34° C. and vented to 15 bar. The vessel was then charged to 35 bar with ethylene for one minute and vented to 5 bar, and this procedure repeated three more times. The vessel was then charged with ethylene to 35 bar, sealed and heated to 100° C. for one hour before cooling to 20° C. and venting completely. The polymer product was collected on a Buchner filter and rinsed with methanol. After drying under vacuum the polymer mass of 6.87 g was analysed for palladium content. A Pd content of 50 microgrammes/g polymer was found, corresponding to 11% of the original palladium charged to the reactor. The untreated polyketone prepared in a similar experiment was found to contain 53% of the palladium.

Example 2 (according to the Invention)

A carbon monoxide/ethylene/propene terpolymer was prepared as follows:

A mechanically stirred autoclave of 300 ml capacity was charged with 48.3 mg of [Pd(1,3-bis(diphenylphosphino)propane) (PhCN)$_2$][BF$_4$]$_2$, 3.0011 g of hydrogen bis(salicylato)borate and 100 cm$^3$ of 2:1 v/v mixture of t-butanol/acetone. The autoclave was sealed and 22.03 g propene condensed in at −78° C. Stirring was commenced. A 1:1 mixture of CO and ethylene was admitted (8 bar gauge) before heating to 70° C. The pressure was adjusted to 53 bar gauge and these conditions maintained for two hours. The vessel was cooled to below 25° C. and vented to 2 bar. The vessel was then charged to 10 bar with ethylene for one minute and vented to 2 bar, and this procedure repeated twice more. The vessel was then vented to atmospheric pressure and charged with 1.5 bar ethylene, sealed and heated to 100° C. for 17 hours.

10.01 g of polymer was isolated by filtration. This was soxhlet extracted with fresh t-butanol/acetone solvent, then dried in vacuo. A Pd content of 20 ppm was found, corresponding to 3% of the original palladium charged to the reactor.

Comparative Example 3

12.11 g terpolymer was prepared according to the method in example 2 using 48.9 mg of Pd catalyst. The polymer was isolated untreated and washed. A Pd content of 57 ppm was found, corresponding to 57% of the original palladium charged to the reactor.

Example 4 (according to the Invention)

11.14 g terpolymer was prepared according to the method in example 2, except 34.9 mg of Pd (1,3-bis(diphenylphosphino)propane) acetate was used. The terpolymer was treated in a similar manner to that set out in Example 2 except that it was treated at 70° C. for 17 hours instead of 100° C. for 17 hours. A Pd content of 184 ppm was found, corresponding to 36% of the original palladium charged to the reactor.

We claim:

1. A process for removing palladium from a contaminated polyketone containing palladium which comprises contacting the contaminated polyketone with an olefin in the substantial absence of carbon monoxide at a temperature above the temperature at which the polyketone was formed and in a solvent in which the contaminated polyketone is insoluble.

2. A process as claimed in claim 1 wherein the process is carried out in the presence of an acid.

3. A process as claimed in claim 2 wherein the acid is present in an amount such that the molar ratio of acid to palladium in the contaminated polyketone is in the range 1:1 to 1,000:1.

4. A process as claimed in any one of the preceding claims wherein the olefin is ethylene, propylene or a mixture of ethylene and propylene.

5. A process as claimed in claims 1, 2 or 3 wherein the olefin is present at a superatmospheric pressure of up to 50 bars.

6. A process as claimed in claims 1, 2 or 3 wherein the solvent is methanol.

7. A process as claimed in claims 1, 2 or 3 wherein the solvent is a mixture of tertiary butanol and acetone.

8. A process as claimed in claims 1, 2 or 3 wherein the solvent is the reaction medium in which the polyketone was formed.

9. A process as claimed in claims 1, 2 or 3 wherein the process is carried out at a temperature which is at least 20° C. greater than the temperature at which the polyketone was formed.

10. A process as claimed in claims 1, 2 or 3 wherein the process is carried out at a temperature in the range 90° to 100° C.

11. A process as claimed in claims 1, 2 or 3 wherein the polyketone is a terpolymer of carbon monoxide, ethylene and propylene.

* * * * *